United States Patent [19]
Florence et al.

[11] Patent Number: 5,264,930
[45] Date of Patent: Nov. 23, 1993

[54] FAST LIGHT INTERCONNECTED PROCESSOR

[75] Inventors: James M. Florence; John B. Allen, both of Richardson, Tex.

[73] Assignee: Texas Instruments Incorporated, Dallas, Tex.

[21] Appl. No.: 656,383

[22] Filed: Oct. 1, 1984

[51] Int. Cl.$^5$ .............................................. H04N 5/33
[52] U.S. Cl. .................................. 358/113; 364/822; 358/225; 250/332
[58] Field of Search ............... 250/330, 332, 334, 342; 358/113, 213, 212, 225, 226, 227, 213.11, 213.23, 213.24; 340/752, 755, 764; 364/807, 822

[56] References Cited

U.S. PATENT DOCUMENTS

| | | | |
|---|---|---|---|
| 3,591,939 | 7/1971 | Payne et al. | 340/752 |
| 3,904,818 | 9/1975 | Kovac | 358/213 |
| 4,010,319 | 3/1977 | Levine | 358/213 |
| 4,064,533 | 12/1977 | Lampe et al. | 358/113 |
| 4,091,414 | 5/1978 | Chow | 358/113 |
| 4,129,887 | 12/1978 | Michon | 358/213 |
| 4,328,492 | 5/1982 | Bobak et al. | 340/764 |
| 4,338,627 | 7/1982 | Stapleton | 358/113 |
| 4,490,744 | 12/1984 | Levine | 358/213 |
| 4,555,731 | 11/1985 | Zinchuk | 358/213 |

Primary Examiner—Thomas H. Tarcza
Assistant Examiner—Bernarr E. Gregory
Attorney, Agent, or Firm—Rene' E. Grossman; Melvin Sharp

[57] ABSTRACT

A fast light interconnected processor device for image processing includes an image sensor for producing a line scan signal, a one-dimensional line display for producing a light having an intensity representative of the scan signal and an array of light detectors for producing a two-dimensional convolution of the image with a blurring function performed simultaneously with the scanning of the image scene. The image sensor is, for example, a thermal imager (forward looking infrared system) which outputs electrical signals representative of thermal energy emanating from a scene. The one-dimensional line display is, for example, a one-dimensional array of light emitting diodes which converts the electrical signals of the thermal image to a light image. And the array of light detectors is, for example, an array of charge transfer devices positioned to receive the light image and produce the two-dimensional convolution of the image with a blurring function performed simultaneously with the scanning of the image scene for a contrast map. A zero crossing detector may be connected to the light detector array for producing an outline of the image. Also, the one-dimensional line display may be positioned as to the detector array to provide an in-focus image for an automatic low frequency gain leveling device for controlling the incoming signal dynamic range to match the display dynamic range.

10 Claims, 9 Drawing Sheets $C = |\mu_T - \mu_B|$; $\mu_T$ = IMAGE AVERAGE IN TARGET GATE
$\mu_B$ = IMAGE AVERAGE IN BACKGROUND GATE $C = \dfrac{A_{BT}}{A_{BT} - A_T} |\mu_T - \mu_{BT}|$; $\mu_T$ = IMAGE AVERAGE IN TARGET GATE
$\mu_{BT}$ = IMAGE AVERAGE IN TARGET-PLUS-BACKGROUND GATE

FAST LIGHT INTERCONNECTED PROCESSOR

This invention relates to electro-optical devices and more particularly to an electro-optical device for processing scanned imagery.

In the past, devices for processing images from scanning image sensors such as forward looking infrared (FLIR) devices have been almost entirely digital processors. For either real time processing or non-real time processing these implementations require extensive computer-type hardware. This hardware is expensive, voluminous and requires a substantial amount of electrical power. These factors have restricted applications to non-portable systems or to portable systems for large carriers.

Further, a major problem exists for the display of images from FLIR devices. The dynamic range of a typical infrared scene exceeds the display capabilities of most display devices. For a dc-coupled FLIR, hot and cold portions of the scene often lie in the nonlinear response region of the display. Important image detail in the hot and cold regions is then lost. AC-coupling is typically used in FLIRs in an attempt to overcome this problem. However, the dynamic range of a display can still be exceeded when a single scan line passes over both a hot and a cold spot of the scene. In addition, the ac-coupling introduces noticeable streaking in the display owing to the removal of the dc level removed from each line.

Accordingly, it is an object of this invention to provide a practical electro-optical device for processing scanned imagery for autonomous systems.

Another object of the invention is to provide a low cost electro-optical device for processing scanned imagery which is compact in size, has reduced power consumption and is suitable for mass production.

A further object of the invention is to provide a means for controlling the incoming signal dynamic range to match the display capabilities while retaining vital image detail.

Briefly stated, the invention comprises an electro-optical device that performs the two-dimensional spatial filtering operations upon which many of the processing algorithms for scanned imagery are based. In addition, the device includes means to implement a real-time two-dimensional automatic low-frequency gain leveling (ALFGL) algorithm. For dc-coupled FLIRs the 2-dimensional ALFGL eliminates the saw-toothed artifact inherent in a one-dimensional implementation without extensive linear phase correction. For ac-coupled FLIRs, the two-dimensional ALFGL implemented with this electro-optical system can help to de-emphasize the streaking in the image while matching the dynamic range of the signal to the display.

Other objects and features of the invention will become more readily apparent from the following detailed description when read in conjunction with the accompanying drawings, in which.

Figure 1:
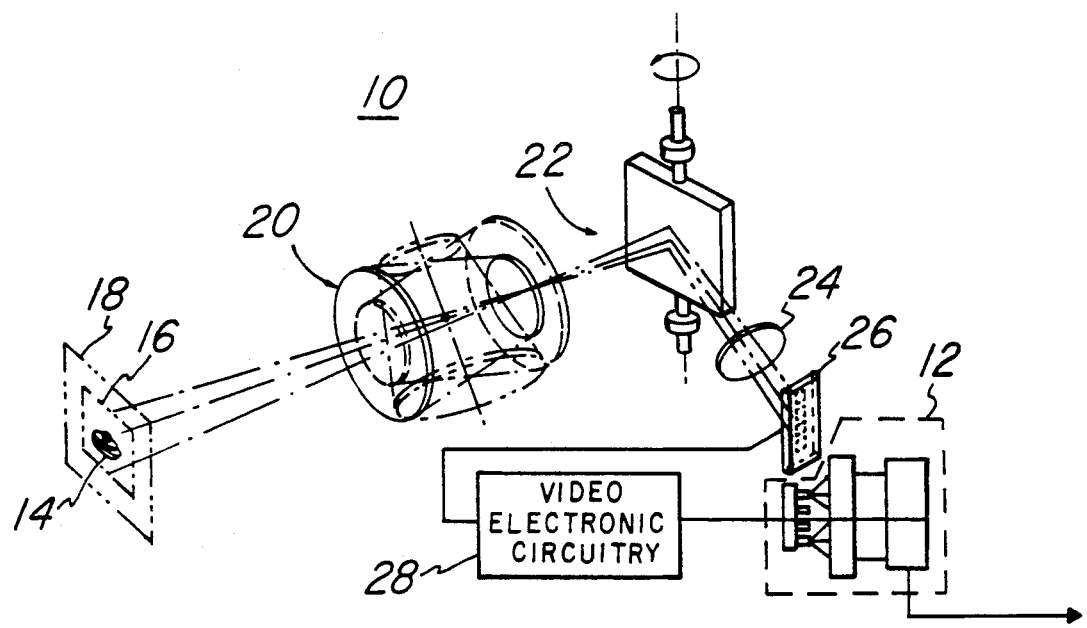
FIG. 1 is a block diagram of a forward looking infrared (FLIR) system embodying the electro-optical device for processing line-scan output of the FLIR.

Referring now to FIG. 1 in which is shown for purposes of description and not by way of limitation a forward looking infrared (FLIR) system 10 incorporating the fast light interconnected processor (FLIP) device 12. A target 14 is shown being tracked in a narrow field-of-view 16 after having been searched for and located in a wide field-of-view 18. The narrow and wide fields-of-view are produced by a rotatable afocal lens system 20 which passes parallel rays of energy emanating from the target scene to a rotating scanner mirror 22. The scanning mirror scans the energy and reflects it through an objective lens 24 for focusing on an array of energy detectors 26 which generates electrical signals representative of the scanned scene. The electrical signals of the scene are amplified to a working level by the video electronic circuitry 28. The electronic circuitry is connected to the fast light interconnected processor device 12, hereinafter described.

The fast light interconnected processor device, during the wide field-of-view scanning, highlights the areas possibly containing targets for closer scrutiny using the narrow field-of-view. During the narrow field-of-view scan, the FLIP device is used to enhance the image display and provide features for target recognition systems. Those persons skilled in the art desiring a more complete description of the FLIR device are referred to U.S. Pat. No. 3,781,559 issued Dec. 25, 1973 to Erwin E. Cooper, assignor to Texas Instruments Incorporated.

By way of introducing the fast light interconnected processor device constituting the subject matter of this invention and by way of background, it is important to note that one of the essential image processing operations for autonomous or semi-autonomous processing systems is target screening. Target screening designates areas of an image that warrant further investigation because of the presence of some detectable feature. Perhaps the most successful target screening operation is the contrast box.

The contrast box operation searches for potential target areas by locating regions of high local image contrast. Those persons skilled in the art desiring additional information concerning the contrast box are referred to M. Burton and C. Benning, "A Comparison of Imaging Infrared Detection Algorithms," SPIE, Vol. 292, Detection and Classification (August, 1981).

Figure 2A:
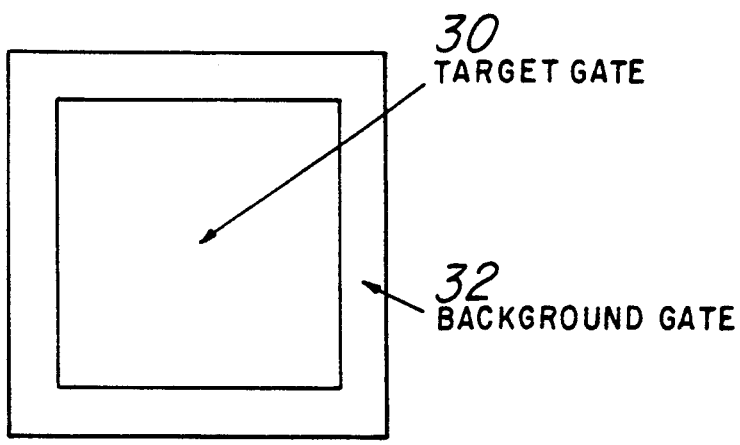
FIGS. 2a and 2b show implementations of the contrast box original algorithm and equivalent algorithm.

As shown in FIG. 2a, the contrast measure is the magnitude of the difference between the average image value in a target gate 30 and the average value in a background gate 32 immediately surrounding the target gate, or $$C = /\mu_T - \mu_B/ \tag{1}$$

where $\mu_T$=Image average in target gate; $\mu_B$=Image average in background gate.

Figure 2B:
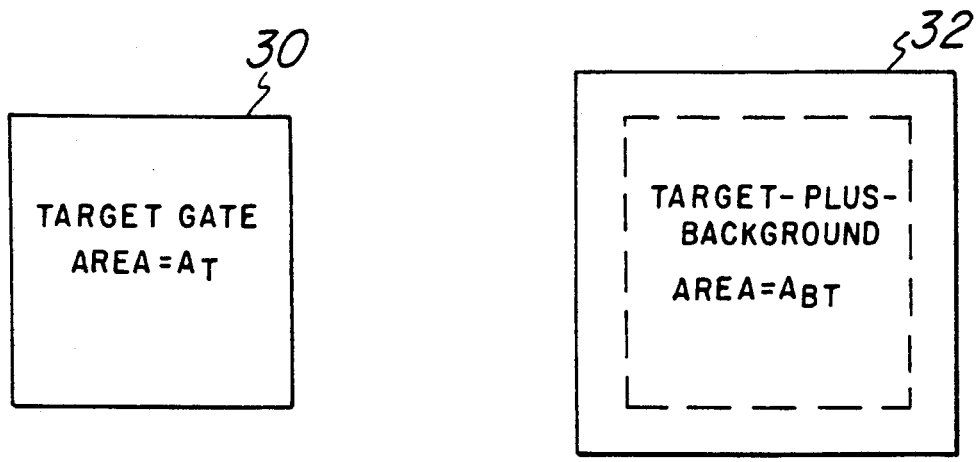

The screening operation is most effective if the target gate size (Area=$A_T$) is matched to the expected target size. The contrast measure is equivalent to the magnitude difference between the average image value ($\mu_T$) in the target gate and the average image value ($\mu_T$) in a slightly larger gate (Area=$A_{BT}$). The larger gate includes both the target and background gates 30 and 32 as shown in FIG. 2b.

The image averaging is equivalent to convolving the image with a rectangular blurring function the same size as the averaging gate. Therefore, to evaluate the contrast measure for all image points the image is convolved first with the target gate and then with the slightly larger target plus background gate. The magnitude of the difference between these two blurred images is the contrast measure. The contrast measure for all points is itself an image and is referred to as the contrast map. The algorithm for this is:

$$C = (A_{BT}/A_{BT} - A_T)(\mu_T - \mu_{BT}) \qquad (2)$$

where $\mu_T$=image average in target gate; $\mu_{BT}$=Image average in target-plus-background gate.

Further, automatic signal level control algorithms, such as the automatic low-frequency gain leveling (ALFGL) algorithm hereinafter described can control the incoming signal dynamic range to match the display capabilities while retaining vital image detail. In the algorithm, the signal displayed, d(x,y), is derived from the FLIR image signal, i(x,y), according to the following:

$$d(x,y) = i(x,y) \quad \text{If } Imin < i(x,y) < Imax \qquad (3)$$

$$d(x,y) = Imin + Ihpf(x,y) \quad \text{If } i(x,y) < Imin \qquad (4)$$

$$d(x,y) = Imax + Ihpf(x,y) \quad \text{If } i(x,y) < Imax \qquad (5)$$

where Ihpf(x,y)=i(x,y)−Ilpf(x,y) and Ilpf(x,y) is the low-pass filtered (blurred) image produced by the FLIP device.

Those persons skilled in the art desiring additional information for ALFGL are referred to Sen-Te Chow, "Automatic Low Frequency Gain Limiting for A-C Coupled Signal Processing Systems", Proceedings of IRIS, I.R. Imaging Special Group, Feb. 1976.

In the algorithm, Imin and Imax represent the minimum and maximum limits of the display capability. If the incoming image signal lies between these limits, the signal is displayed. If the incoming signal lies outside the limits (either high or low), the display signal is the limiting value (again either high or low) plus the high pass filtered version of the incoming signal. In this manner, the dynamic range of the display signal matches the capabilities of the display device and it retains the image detail contained in the high spatial frequencies.

As indicated above, the high-pass image can be formed by subtracting a low-pass filtered version of the input image from the original input. This high-pass filtering can be implemented directly in the fast light interconnected processor device and simple analog thresholding circuits can control the formation of the display signal. The fast light interconnected processor device can therefore be used to perform the ALFGL algorithm and the operation is performed in real-time for all incoming frames. In addition, the high-pass filtering performed by fast light interconnected processor devices is fully two-dimensional. The algorithm is thus real-time two-dimensional ALFGL that is not prone to the streaking or saw-tooth artifact problems occurring in one-dimensional ALFGL.

Figure 3A:
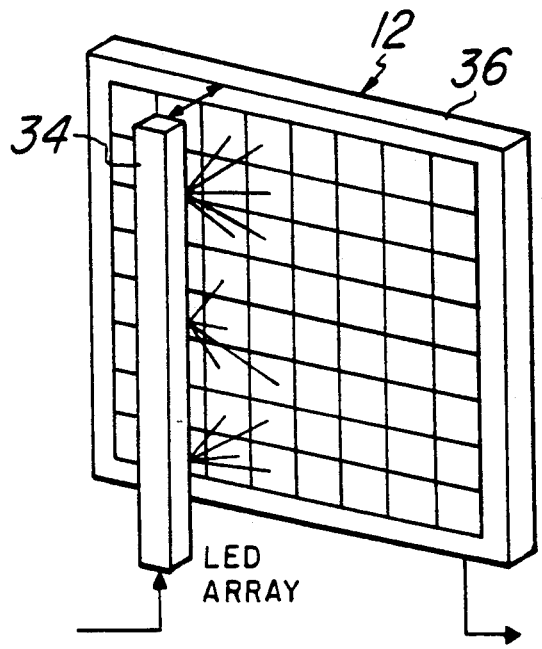
FIGS. 3a and 3b are first and second embodiments of the fast light interconnected processing device.

Referring now to FIG. 3a, the fast light interconnected processor device 12 performs the required blurring or low-pass filtering $I_{LPF}$ operation. For purposes of description the image scene sensor is a FLIR that transforms an infrared scene into non-interlaced vertical line scans; nevertheless, the sensor could be a TV camera or some other type of image scanner. The line scan signal is input to a one-dimensional line display 34 such as, for example, a single line CRT, a one-dimensional light emitting diode (LED) array or some similar one-dimensional array of light emitters. As shown in FIG. 3a, the display is a single line LED array. The display is placed a very small distance (hereinafter described) from a two-dimensional array of integrating light detectors 36 such as, for example, charge transfer device array, E.G., CCD or CID, or similar detecting devices. A charge coupled device is shown in FIG. 3a.

The light emitted by each diode of the display 34 spreads out (blurs) as it propagates from the LED array to the detector array 36. Light from a single diode therefore affects all detectors illuminated by the light blur. After each line scan the charge built-up and stored in each element of the detector array 36 is shifted by one picture element (pixel) in the cross-scan direction (left-to-right, FIG. 3a). In this fashion the image is both blurred by the spreading of the light and properly registered by the shifting and adding in the detector array. This two-dimensional convolution of the image with the blurring function is performed simultaneously with the scanning of the image scene. When the entire image frame has been scanned, the blurred image can be read out from the charge stored in the device 36. The device 36 is then ready to process the next image frame. Those persons skilled in the art desiring more information about the operation of charge transfer devices are referred to U.S. Pat. No. 4,327,291 issued Apr. 27, 1982 to R. A. Chapman et al, assignors to Texas Instruments Incorporated.

The amount of image blur produced by the fast light interconnected image processing device depends on how far the light propagates from the LED array to the display. If the LED display is flush against the CCD array, there is a direct one-to-one interconnection between the LEDs and the detectors. The result will be an in-focus (non-blurred) image. As the LED is moved back from the CCD detector, the blurring function can be expressed analytically as a convolution of the LED emitting aperture with the function $$b(x,y) = z^2/\pi/(x^2 + y^2 + z^2)^2 \qquad (6)$$

where z is the distance between the LED and the CCD and x,y are the position coordinates on the detector array. After the diode array has moved back from the detector more than a few diode widths, the blurring function becomes essentially equal to equation 3 (the effect of the LED aperture is negligible).

Figure 3B:
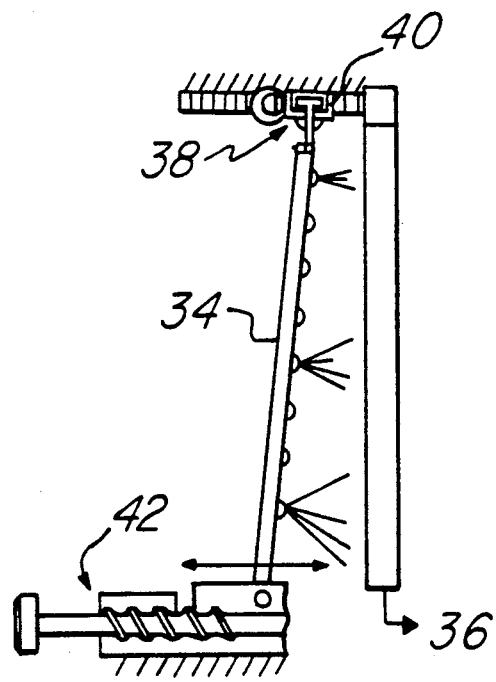

A one-dimensional change of the blurring size in the cross-scan direction can be made by tilting the LED display 34 relative to the plane of the detector array 36 (FIG. 3b). The amount of blur produced by the system of FIG. 3b will be larger at the bottom of the image than at the top. The blur size will change continuously from top to bottom. This type of space-variant blurring is useful if the size of the blur must match the image of a target whose range from the image scanner changes in the image. For example, the image of a target will be larger in the foreground (toward the bottom) of the frame while the image of a similar sized target will be small in the background (toward the top). The space-variant blur introduced by tilting the display 34 will match the blur to target size throughout the frame.

Positioning of the LED display relative to the detector array, including tilt of the display for space-variant processing, can be controlled with an appropriate mechanical device. Motor driven hinges 38 (FIG. 3b) or gimballed mounts on sliding tracks 40 can be combined with a motor driven micropositioner 42 to change the LED-CCD alignment and adapt the processing to changing imaging situations.

Image screening operations implemented with the fast light interconnected processor system perform significantly better in the presence of additive noise than the corresponding digital implementations; this is a result of the different filtering functions associated with the two implementations. In the optical system, the filtering or blurring function is a smooth shaped Gaussian-like function. Digital implementations use uniform amplitude rectangular shaped blurring functions to reduce the hardware complexity. The differences in the two types of filtering functions are best illustrated by looking at the spatial frequency transfer functions for the operations.

Figure 4A:
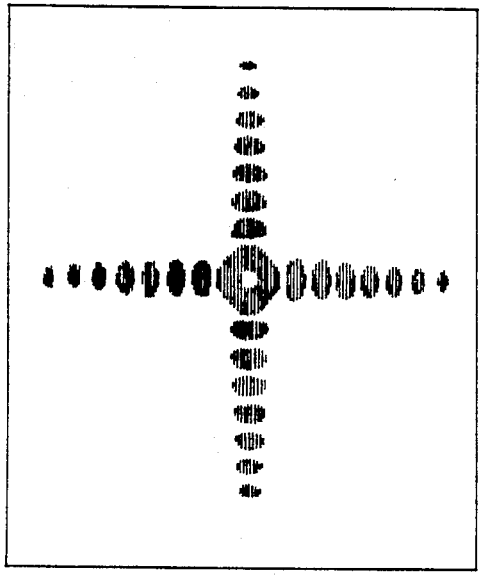
FIGS. 4a-4d are charts comparing the spatial frequency transfer function of the fast light interconnected processor system to that of a corresponding digital system.
Figure 4C:
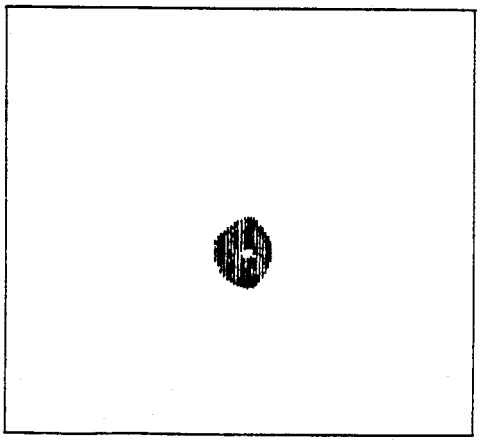
Figure 4B:
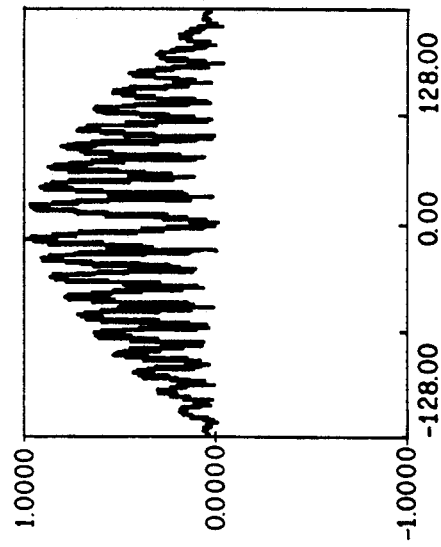
Figure 4D:
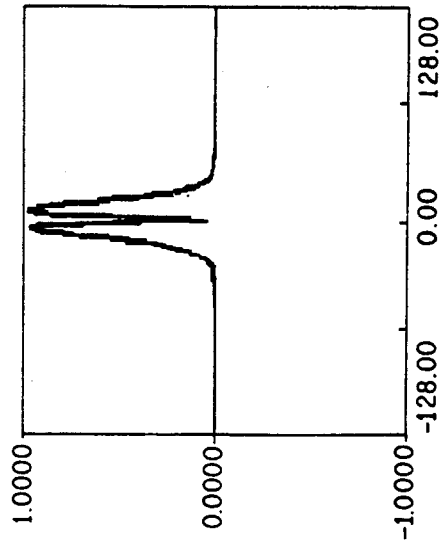

The two-dimensional transfer functions are shown in FIGS. 4a and 4b with the optical transfer function in FIG. 4a and the digital transfer function in FIG. 4b. The plots shown in FIGS. 4c and 4d represent the amplitude variations of a slice through the middle of the transfer functions of FIGS. 4a and 4b, respectively. The two distributions have basically the same structure for the low spatial frequencies (in the middle of the distributions). However, the digital transfer function (FIG. 4d) has significant side lobe structure at high spatial frequencies. Most image information useful to the screener is contained in the low spatial frequencies while additive noise is typically found at all spatial frequencies. The digital implementation therefore passes significant high frequency noise energy that degrades the resulting contrast map. The optical transfer function (FIG. 4c) has no side lobes and thus removes the high frequency noise in the process of forming the contrast map.

Figure 5A:
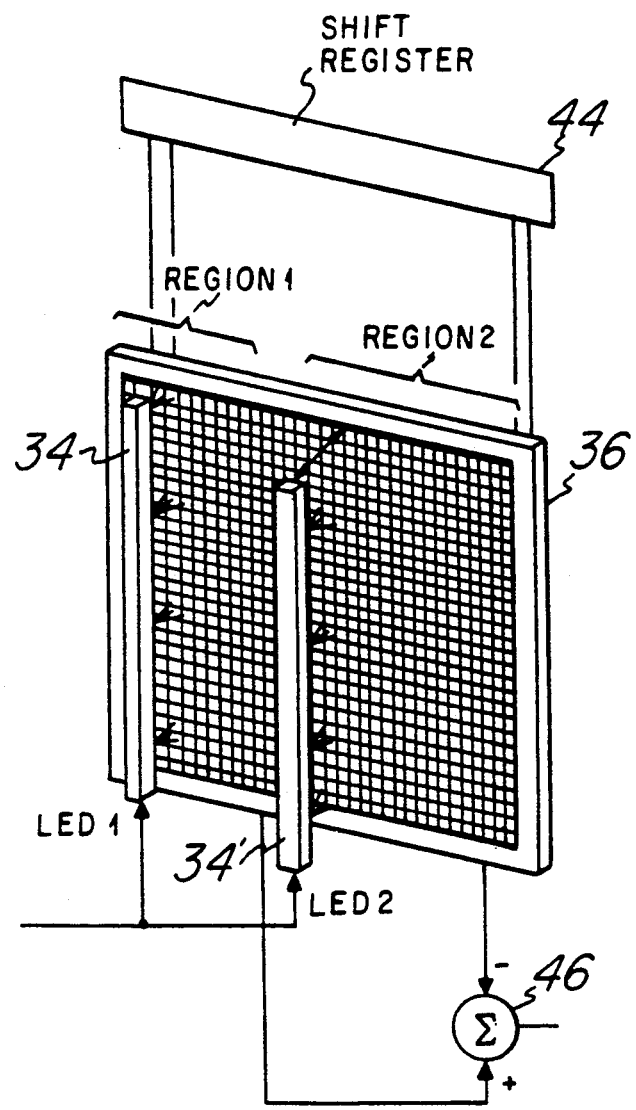
FIGS. 5a-5c are embodiments of the optically interconnected image processing device.

Referring now to FIG. 5a, in which the fast light interconnected processor device is arranged to produce an optical processed version of the image contrast map for target screening. In this arrangement the scanned electrical (video) signal is simultaneously introduced into two LED displays 34 and 34'. The LED displays 34 and 34' are both displaced from the detector array 36 with display 34' displaced slightly farther than LED 34. Thus, two blurred images are produced simultaneously with one blur slightly larger than the other. When the convolutions are complete, the images are clocked out by shift register 44 and subtracted in adder (difference means) 46 to form the contrast map.

It is not necessary to complete the two convolutions over the entire image before beginning the formation of the contrast map. Light from LED 34 (FIG. 5a) illuminates detectors in region 1 while light from LED 34' illuminates detectors in region 2. As the imaging scan progresses from left to right, the stored charge will be shifted out of the illuminated regions. The charge stored will no longer be affected by the light from the LED's and can be clocked out in line fashion to form the contrast map. The contrast map is therefore produced at the imaging frame rate with a partial frame delay.

The bluring function associated with this optically processed contrast map is that given by equation 6. This function has Gaussian-like characteristics that eliminates confusing artifacts and reduces the sensitivity of the process to additive noise (FIGS. 4a and 4b). By tilting the displays (FIG. 3b) the device produces a space-variant contrast map.

Figure 6A:
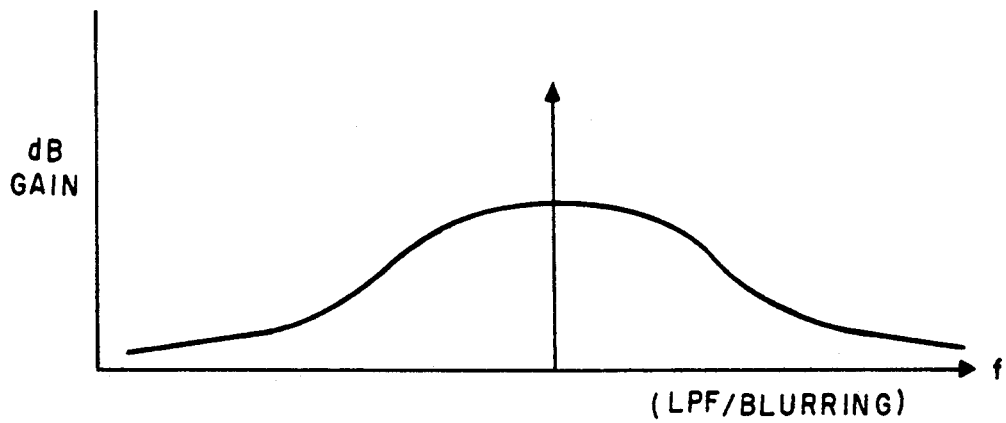
FIGS. 6a-6c are charts showing the filtering effects of image blurring.
Figure 6B:
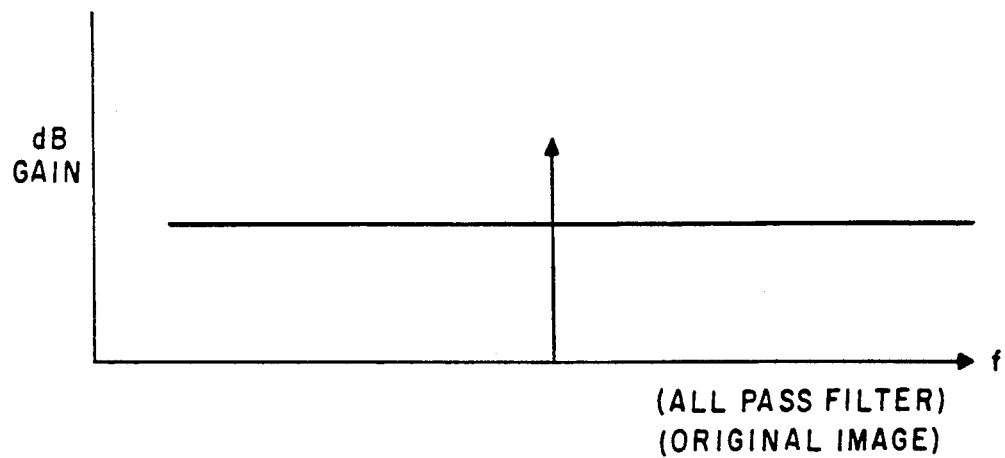
Figure 6C:
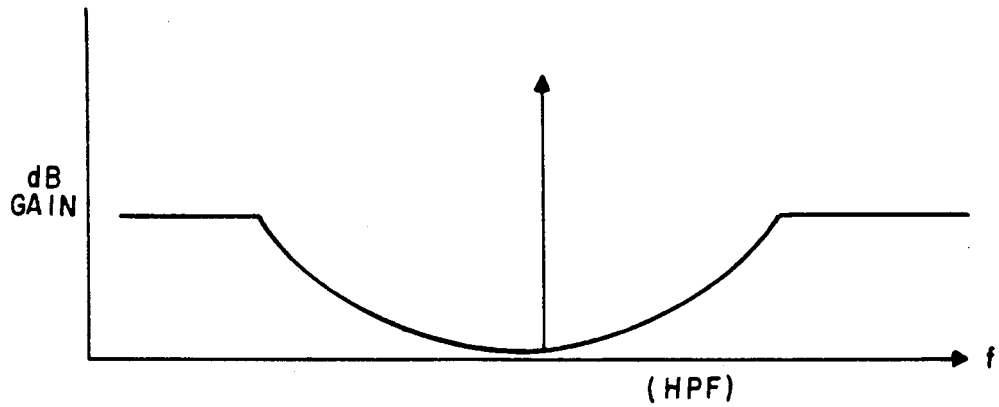

The device can also be used without modification to perform an enhancement by high-pass filtering (FIGS. 6a-6c). A high-pass filter (FIG. 6c) can be implemented as an all-pass filter (FIG. 6b) minus a low-pass filter (FIG. 6a). For images, this could represent the difference between an in-focus image and an LPF blurred image. If the LED display 34 is placed in contact with the detector 36 and LED 34' displaced, the resulting subtraction is the in-focus image minus the LPF blurred image.

Figure 5B:
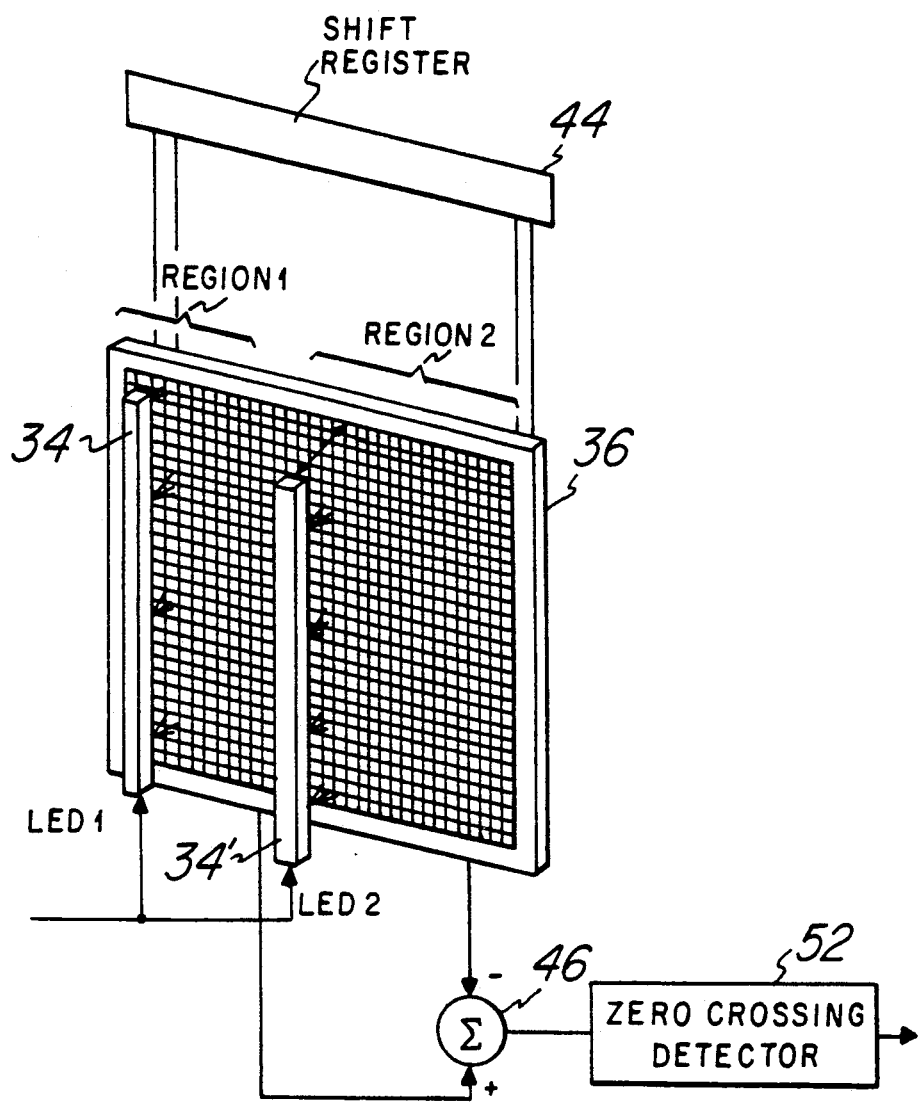

For edge detection, the fast light image processor device of FIG. 5a further includes a zero crossing detector 52 (FIG. 5b) connected to the difference means (adder) 46. The zero crossing detector, using the zero crossing signals provides an outline of the image. Edge detection is used to provide target feature information to a target recognition system and for the display of target edge maps.

Figure 5C:
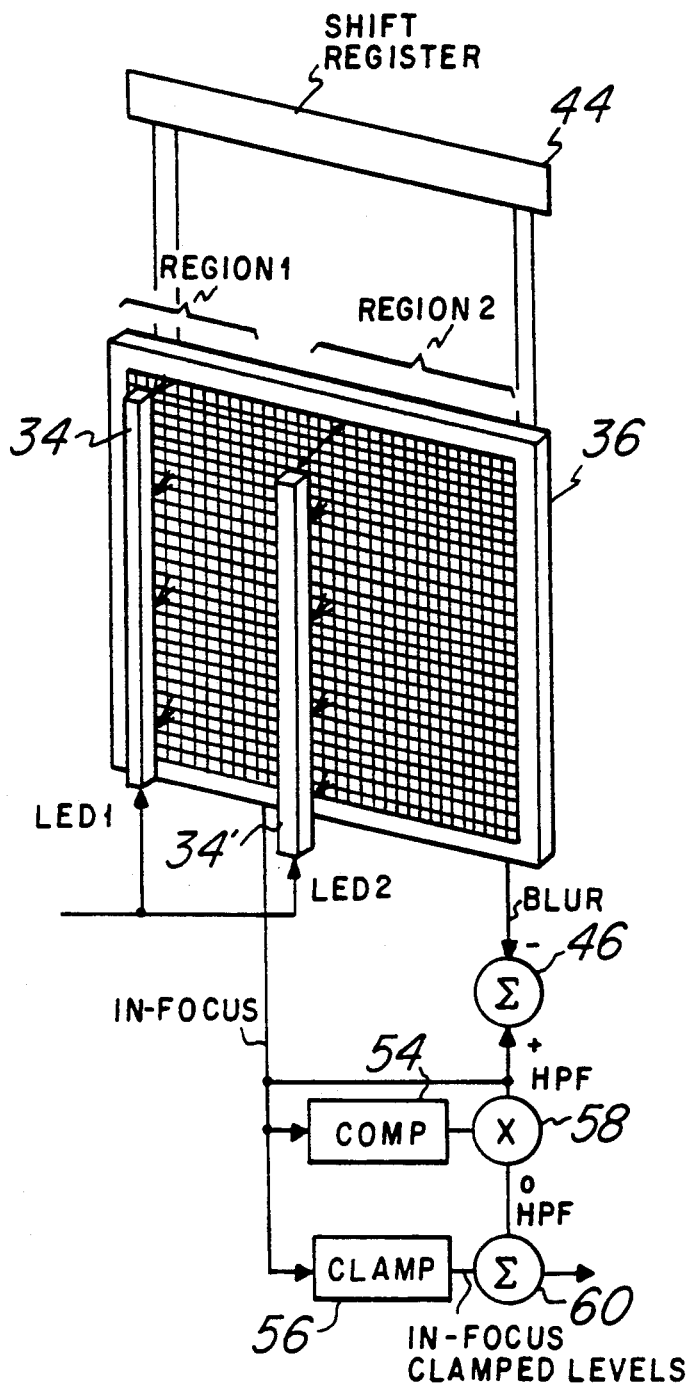

Further, for ALFGL, the in-focus image of the detector array 36 (FIG. 5c) is connected to a comparator 54 and clamp 56 in addition to the difference means 46. The comparator 54 compares the in-focus image value with high and low limits set by the dynamic range of the display and outputs a zero when within the limits and a one when outside the limits (plus or minus) to a multiplier 58. Multiplier 58 is connected to the difference means 46 and outputs either a zero or the high-pass filter image—a zero when within limits and the high-pass image when without the limits.

The clamp 56 receives the in-focus image and outputs the in-focus image when it is within the limits of the display or the high or low limit when the display's range is exceeded. An adder 60 is connected to the multiplier 58 and clamp 56 for combining their outputs in accordance with the above equations 3, 4 or 5. Thus, the output signal levels are matched to the dynamic range of the display.

Figure 7:
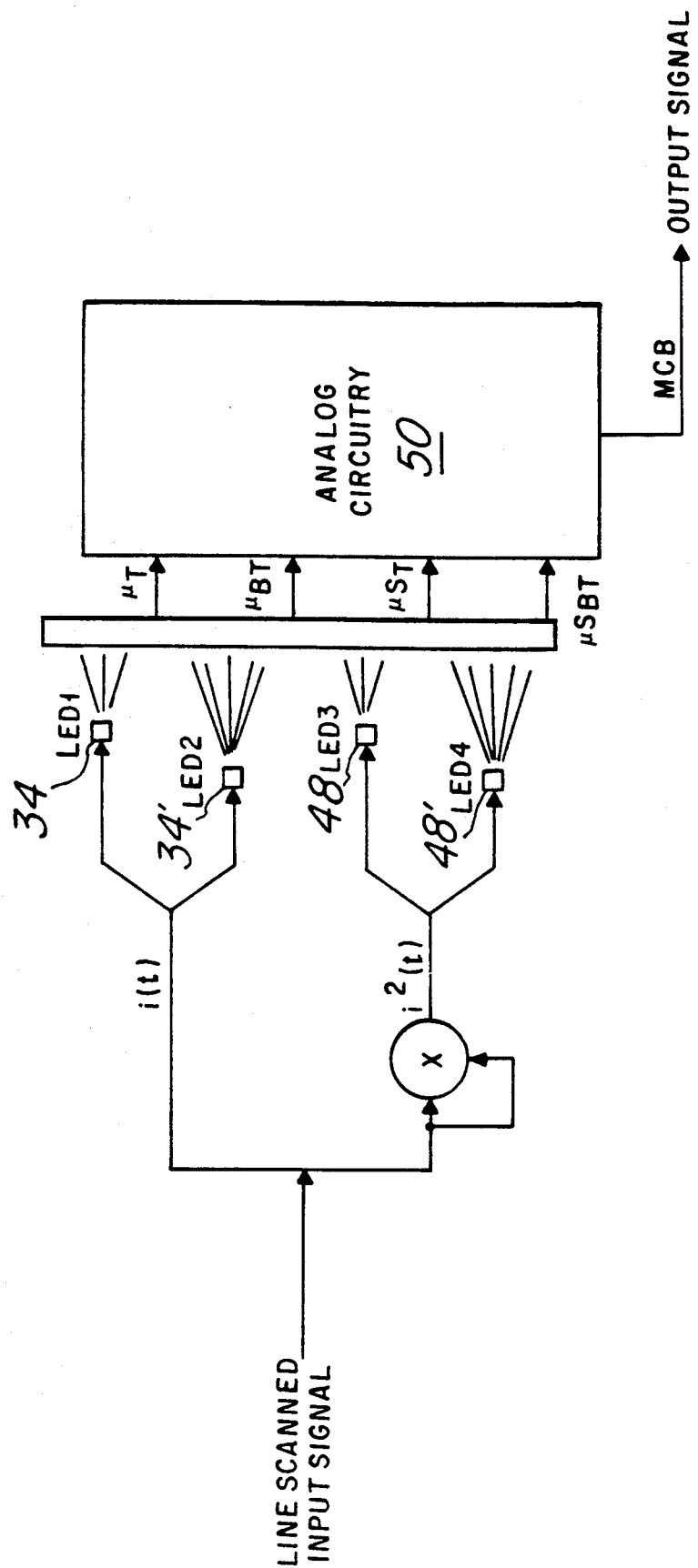
FIG. 7 is an additional embodiment of the fast light interconnected processor.

Referring now to FIG. 7 in which is shown the optical interconnected image processor device of FIG. 3a modified to perform the modified contrast box operation. The modified contrast measure is given by $$C = [(\mu_T - \mu_B)^2 + \text{sigma}_T^2]/\text{sigma}_B \qquad (7)$$

where $\mu_T$ is the mean image value in the target region, $\mu_B$ is the mean$_2$ image value in the background region, sigma$_T$ is the image variance in the target region, and sigma$_B$ is the image standard deviation in the background region. The modified contrast measure accounts for the different mean values for contrast targets as well as the target variance of bimodal targets that might be missed in a conventional contrast box screener.

The modified contrast box device (FIG. 7) comprises the two LED displays 34 and 34' and in addition two more LED displays 48 and 48'. Displays 48 and 48' are used to display the square of the image. Thus, four images are formed—two blurs of the original image, the mean values $\mu_T$ and $\mu_{bt}$ and two blurs of the square of the image, the mean square values $\mu S_T$ and $\mu S_{BT}$. As the four images are clocked out of the CCD array they are combined by analog electronic circuitry 50 to form the modified contrast measure. In terms of the four images generated by the optical interconnected image processing device, the modified contrast measure is $$C = [(Z_2^2/Z_2^2 - Z_1^2)(\mu_T - \mu_{BT})^2 + \mu S_T - \mu_T^2]/[(Z_2^2\mu S_{BT} - Z_1^2\mu S_T)/Z_2^2 - Z_1^2 - (Z_2^2\mu_{BT} - Z_1^2\mu_T)^2/Z_2^2 - Z_1^2]^{\frac{1}{2}} \qquad (8)$$

where $Z_1$ is the LED-CCD displacement distance for the target blur, and $Z_2$ is the LED-CCD displacement distance for the targe-plus-background blur.

It will be appreciated by those persons skilled in the art that the fast light interconnected processor device can be used in other image processing operations. For example, image reformatting wherein the optical interconnections and the image storage capabilities make it possible to read an image into the device in one format and read it out in another. Thus, a non-interlaced vertical line scan (one way scan) of a scene can be read into the CCD array through the LED display. Once the image frame is complete, the stored image can be read out in the two-field interlaced horizontal line scan compatable with conventional video displays. The incoming image can be in-focus with the LED's flush against the CCD array, or the image can be blurred for reformatted processing.

Another area of application of the device is in adaptive image processing. An example of this is local area gain brightness control image enhancement. In this image processing operation, the gain of edge enhancing high pass filters is increased in dark regions of the image. This will bring out detail that would otherwise be lost in an image of wide dynamic range. The use of the device as a high-pass-filter has been described. For local area gain brightness control filtering, a third LED-CCD combination is used to calculate the local scene brightness; i.e., the weighted image average over a suitably sized region. The brightness measurement is then used to control the gain of the high-pass-filter implemented by the other two LED-CCD combinations.

Further, it will be appreciated by those persons skilled in the art that the FLIP device can be used for processing images produced by any scanning format such as, for example, interlaced (two-way) scanning. In the two-way scan the scene is scanned as two fields that are interlaced to produce the total image frame. In a FLIP device for the two-way scanner, the first field can be read into the CCD. Then the stored charge image of this field is clocked passed the LED array a second time to add the second field to the final frame. The total frame is then available to be read out in single line video format for conventional CRT display. In addition, all image processing operations herein described can thus be implemented for two-way scanners using the FLIP device.

Although several embodiments of this invention have been described, it will be apparent to a person skilled in the art that various modifications to the details of construction shown and described may be made without departing from the scope of this invention.

What is claimed is:

1. A fast light interconnected processor device for image processing comprising:
    a) an image sensor means for producing a scan signal;
    b) a one-dimensional line display means connected to the image sensor means for producing a column of light having an intensity representative of the scan signal;
    c) an array of light detectors having a first end and a second end for integrating the light of the one-dimensional line display means by storing the detected scan signal; and
    d) means for blurring the detected scan signal over the distance between the first end and the second end by varying distance that the column of light is positioned from the array of light detectors from the first end of the array of light detectors to the second end of the array of light detectors.

2. The fast light interconnected processor device according to claim 1 wherein the image sensor means for producing a line scan signal is an infrared energy detecting device.

3. The fast light interconnected processor device according to claim 1 wherein the one-dimensional line display means includes a cathode ray tube.

4. The fast light interconnected processor device according to claim 1 wherein the one-dimensional line display means includes a plurality of light emitting diodes.

5. The fast light interconnected processor device according to claim 1 wherein the array of light detectors is an array of charge transfer devices selected from the group consisting of charge coupled devices and charge injection devices.

6. The fast light interconnected processor device according to claim 1 wherein the means for varying the distance includes a hinge means and a micropositioner means operatively connected to the line display means for tilting the line display means with respect to the array of light detectors.

7. The fast light interconnected processor device according to claim 6 further including a micropositioner means operatively connected to the means for varying the distance.

8. The fast light interconnected processor according to claim 1 wherein the array of detector is divided into a first region and a second region and the line display means includes a first line display operatively positioned in front of the first region and a second line display operatively positioned in front of the second region, said first line display being selectively positioned a first distance from the detector array with said second line display being positioned a second preselected distance from the detector array, and a clocking means operatively connected to the array of detectors for clocking out the detected line scan signals from the first and second regions and a difference means connected to the first and second regions of the detector array whereby the detected line scan signals are clocked out and subtracted forming a contrast map thereby.

9. The fast light interconnected processor according to claim 8 further including:
    a means for squaring the scan signal;
    a third and fourth line display to display the square of the image as represented by the squared detected scan signal; said third and fourth line displays operatively connected to the array of detectors which additionally includes a third and fourth region and the third line display being positioned over the third region at the first selected distance from the array of light detectors and the fourth line display being positioned over the fourth region at the second preselected distance from the array of light detectors; the four line displays and the four regions being for forming four images constituting two blurs of the scan signal and two blurs of the squared image, analog circuitry and clocking means, said clocking means for clocking out signals representing the four images from the array of detectors to the analog circuitry for combining to form a modified contrast measure.

10. The fast light interconnected processor according to claim 8 further including a zero detector operatively connected to the difference means for providing image edge detection.

* * * * *